Oct. 13, 1925.

P. B. ANDERSON

TRANSIT

Filed July 7, 1923

Inventor

P. B. Anderson

By C. A. Snow & Co.

Attorneys.

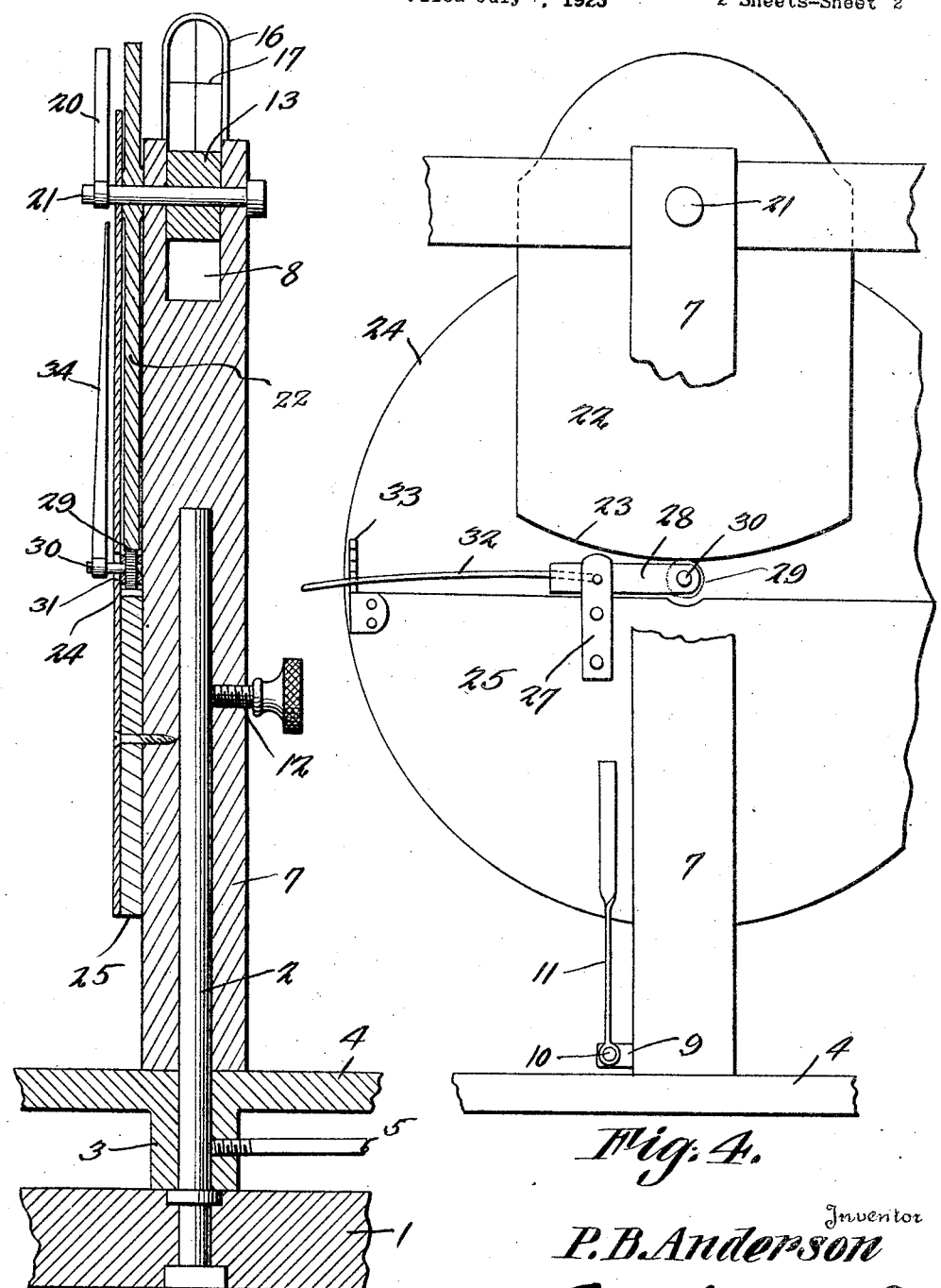

Patented Oct. 13, 1925.

1,557,233

UNITED STATES PATENT OFFICE.

PIERCE BUTLER ANDERSON, OF BROWNSVILLE, TENNESSEE.

TRANSIT.

Application filed July 7, 1923. Serial No. 650,078.

*To all whom it may concern:*

Be it known that I, PIERCE BUTLER ANDERSON, a citizen of the United States, residing at Brownsville, in the county of Haywood and State of Tennessee, have invented a new and useful Transit, of which the following is a specification.

This invention relates to transits, and is designed more particularly as an improvement upon the structure disclosed in my prior Patent 1,481,672, dated Jan. 22, 1924.

One of the objects of the invention is to provide an improved form of transit for measuring distances, computing areas, etc., there being simplified mechanism for indicating minute fractions of degrees.

A further object is to provide an indicating finger or pointer cooperating with a dial for indicating degrees and fractions thereof, there being novel means for coupling this pointer to and uncoupling it from the sight of the transit so that measurements in degrees can be read from a starting point at which the sight is pitched at any predetermined angle.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings

Fig. 3 is an enlarged section on line 3—3, Fig. 1, said section being taken through a portion only of the base and the binding screw of the base dial being in position at right angles to the position shown in Fig. 1.

Fig. 4 is a rear elevation on an enlarged scale of a portion of the structure.

Figure 2:
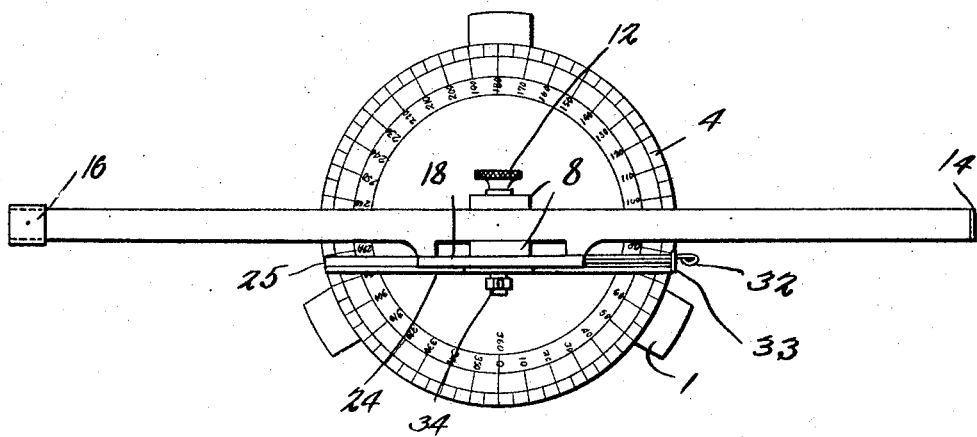
Fig. 2 is a plan view of the transit.

Referring to the figures by characters of reference 1 designates the head of a tripod and fixedly mounted in the center thereof and extending perpendicularly therefrom is a centering spindle 2. The hub 3 of a dial 4 is rotatably mounted on the spindle and bears on the head 1, this dial being provided with marginal graduations indicating the degrees of a circle, as shown in Fig. 2. A binding screw 5 is mounted in the hub 3 and has a head 6 supported beyond the periphery of the dial where it can be grasped readily for the purpose of turning the screw to engage the spindle or release it. Obviously when the screw is tightened, the dial will be held in any position to which it may have been moved.

Resting on the dial 4 and mounted for rotation on the spindle 2 is a standard 7, the upper end of which is forked as shown at 8. Secured to the lower end portion of the standard is a bracket 9 having a laterally extended pin 10 on which is pivotally mounted at one end an indicator or pointer 11 that frictionally engages the pin. This pointer will be held in any position to which it may be moved, and when in use, is extended to stand horizontally so the end portion will be close to but above the graduated periphery of the dial 4. In Fig. 4 the index or pointer has been shown swung upwardly out of the way. The lower or active position of the pointer has been indicated by broken lines in Fig. 1.

The standard 7 is held against rotation upon the spindle 2 by a set screw 12. Pivotally mounted in the forked end of the standard is the middle portion of the sight arm 13. This arm is provided at one end, with a sight plate 14 having the usual peep hole 15. A loop 16 straddles the other end of the arm 13 and, as shown in Fig. 3, has the usual arrangement of crossed hairs 17. A segment 18 is carried by and fixed relative to sight arm 13 close to the fulcrum thereof and is graduated as at 19, there being a stationary pointer or indicator 20 mounted on the pivot pin 21 of the sight arm 13 and extending close to the graduated edge of the segment 18.

Depending from and movable with the segment 18 and the sight arm 13 is a plate 22 having an arcuate lower edge 23 concentric with the pin 21. This plate is disposed back of a dial 24 that is fixedly mounted relative to the standard 7, there being a spacing block 25 interposed between the standard and dial and secured thereto at a point below the plate 22. This dial has its front face graduated along the periphery to indicate degrees and minute fractions thereof, as shown at 26. The central uppermost graduation on the dial is preferably indicated by the character "0." The degree graduations at the left of the "0" graduation are numbered consecutively from "1" upwardly and the degree graduations at the right of the "0" graduation are similarly numbered from "1" upwardly.

A bracket 27 is secured to the spacing block 25 and has a lever 28 pivotally mounted thereon. One end of this lever carries a wheel 29 having a minutely serrated or milled periphery, this wheel being rotatable with a short spindle 30 journaled in the lever 28 and extending through a central opening 31 in the dial 24. A spring arm 32 is extended from the other end of the lever 28 and projects past the periphery of the dial 24, there being a toothed arm or rack 33 carried by the block 25. Arm 32 is adapted to be placed in engagement with any one of these teeth. Obviously by pulling the resilient arm downwardly, and placing it in engagement with a tooth the wheel 29 will be swung upwardly and thrust tightly against the arcuate edge 23 of the plate 22. This edge can be roughened so as to be properly engaged by the serrated or milled periphery of the wheel 29 or it can be made of a soft material into which the serrations will bite. An index or pointer 34 is secured to the outer or forward end of the spindle 30 and is adapted to swing in a circle upon the dial 24.

The several parts are so proportioned that when the sight arm 13 is horizontal the index or pointer 20 registers with the middle graduation 19 on the segment 18 and the index or pointer 34 can be made to register with the "0" graduation on the dial 24. When the arm 13 is tilted out of horizontal position, the degree of the angle to which it is tilted will be indicated by the index or pointer 34 because during the swinging action of the arm 13 the edge 23 of plate 22 will rotate wheel 29 and cause the pointer 34 to move in a circle.

This pointer will indicate not only the degrees but minute fractions thereof. Should the indicator or pointer 34 make more than one complete rotation, another graduation 19 will be brought into register with the index or pointer 20. Thus the graduated segment 18 will indicate the number of rotation of the index or pointer 30 relative to the dial 24. Should the sight arm 13 be disposed at an angle to the horizontal, or in other words, out of a horizontal position at the beginning of the measuring operation, the wheel 29 can be lowered by disengaging arm 32 from the toothed member 33. Pointer 34 can then be brought to its "0" position and the arm 32 replaced with wheel 29 in engagement with the edge of plate 22. Thus further movement of the arm 13 away from the initial position will be indicated in degrees and fractions thereof by the index 34 and the dial 24.

Degrees of rotation about a vertical axis can be measured by means of the dial 4 and the index 11. The dial can be set with the "0" graduation in position to register with the index 11. It can then be held against further movement by means of the screw 6. Standard 7 can be loosened on spindle 2 and rotated until the index 11 comes to the desired graduation on dial 4.

Figure 1:
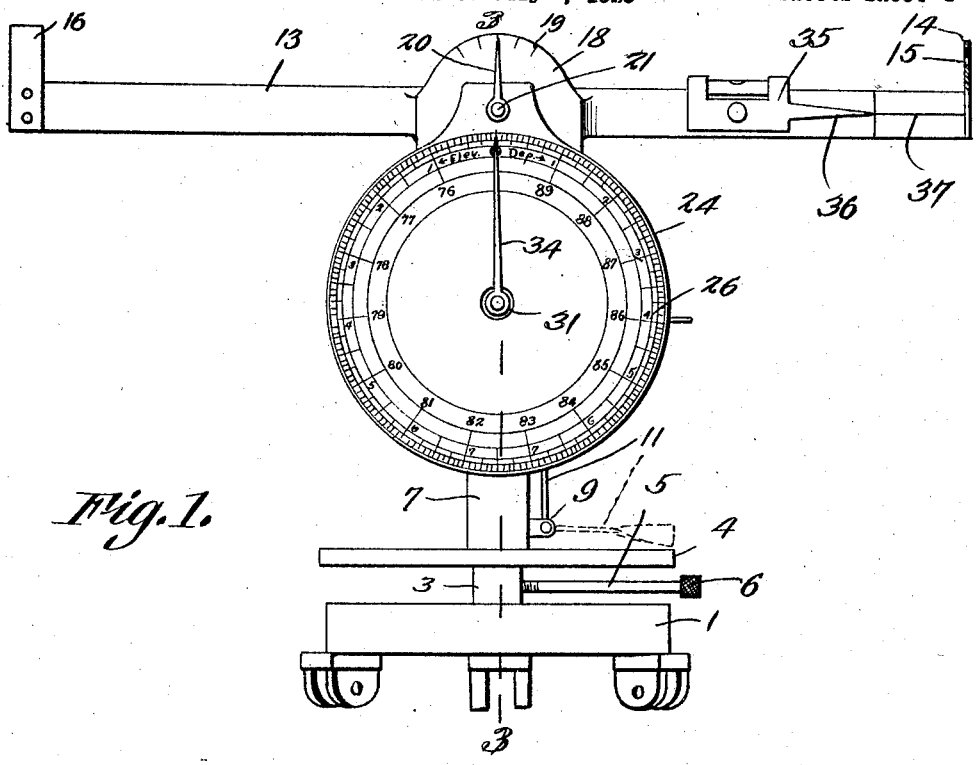
Figure 1 is an elevation of the transit.

If desired, as shown in Fig. 1, a spirit level 35 can be pivotally connected to one side of the sight arm 13, this spirit level having a pointer 36 cooperating with a graduation 37 to indicate when the tube of the spirit level is parallel with the longitudinal axis of the sight arm.

What is claimed is:

1. In a transit, the combination with a standard, of a sight arm adjustable to different angles relative to the standard, a graduated dial fixed relative to the standard, a segmental plate adjustable angularly with the sight arm, a wheel, yielding means for holding the wheel in operative engagement with the segmental plate, and a pointer rotatable with the wheel upon one face of the dial.

2. A transit including a standard, a sight arm fulcrumed thereon, a segmental plate movable with the sight arm, a graduated dial fixed relative to the standard, a lever, a wheel journaled in the lever, a resilient arm extending from the lever, means carried by said dial for engagement by the arm to hold the wheel pressed yieldingly against the segmental plate, and a pointer rotatable with the wheel and upon one face of the dial.

3. A transit including a spindle, a dial rotatably adjustable thereon, a standard rotatably adjustable on the spindle, means on the standard and co-operating with the dial for indicating the degree of rotation of the spindle relative to the dial, a sight arm tiltable on the standard, a segmental plate carried thereby, a wheel, yielding means for moving the wheel into and out of frictional engagement with the plate, means for engaging said yielding means to hold the same in any position to which it may be moved, a stationary dial on the standard, a pointer rotatable with the wheel over one face of the dial, and means for indicating the number of complete rotations of the pointer relative to the dial.

4. A transit including a sight arm, a supporting structure on which said arm is tiltably and rotatably mounted, cooperating means adjacent said arm and fixed and movable respectively relative to the sight arm for indicating the angle of the arm when tilted, a member for actuating the movable indicating means, an operating element connected to the arm for actuating said member, and yielding means for holding said element and member in operative engagement.

In testimony that I claim the foregoing as my own, I have hereto affixed my signature.

PIERCE BUTLER ANDERSON.